United States Patent
Sakurai

(10) Patent No.: US 10,038,849 B2
(45) Date of Patent: Jul. 31, 2018

(54) IMAGING DEVICE WITH CONTROLLED TIMING OF IMAGES TO BE SYNTHESIZED BASED ON SHAKE RESIDUAL

(71) Applicant: Panasonic Intellectual Property Management Co., Ltd., Osaka (JP)

(72) Inventor: Mikio Sakurai, Osaka (JP)

(73) Assignee: Panasonic Intellectual Property Mangement Co., Ltd., Osaka (JP)

( * ) Notice: Subject to any disclaimer, the term of this patent is extended or adjusted under 35 U.S.C. 154(b) by 0 days.

(21) Appl. No.: 15/447,264

(22) Filed: Mar. 2, 2017

(65) Prior Publication Data

US 2017/0272655 A1    Sep. 21, 2017

(30) Foreign Application Priority Data

Mar. 16, 2016   (JP) .................................. 2016-051768
Dec. 28, 2016   (JP) .................................. 2016-254948

(51) Int. Cl.
*H04N 5/232*       (2006.01)
(52) U.S. Cl.
CPC ....... *H04N 5/23267* (2013.01); *H04N 5/2327* (2013.01); *H04N 5/23258* (2013.01); *H04N 5/23287* (2013.01)
(58) Field of Classification Search
CPC .................................................. H04N 5/23267

USPC ......................................... 348/208.2, 208.99
See application file for complete search history.

(56) References Cited

U.S. PATENT DOCUMENTS

2002/0097324 A1* 7/2002 Onuki .................. H04N 5/2259
                                                          348/208.99
2016/0212332 A1* 7/2016 Tang ................... H04N 5/23232

FOREIGN PATENT DOCUMENTS

JP         2016-005094         1/2016

\* cited by examiner

*Primary Examiner* — Joel Fosselman
(74) *Attorney, Agent, or Firm* — Renner Otto Boisselle & Sklar, LLP

(57) ABSTRACT

An imaging device includes an optical system including a plurality of lenses, an imaging element that images a subject image formed by the optical system, a shake detector that detects a shake of the imaging device, a lens driving controller that moves one of the plurality of lenses on a plane perpendicular to an optical axis based on an output signal from the shake detector to correct the shake, an imaging element driver that moves the imaging element on the plane perpendicular to the optical axis, an imaging controller that causes the imaging element to perform an imaging operation to obtain image data, and an image processor that performs a plural number of the imaging operations while moving the imaging element by a predetermined amount and synthesizes a plurality of obtained images to generate a synthesis image.

3 Claims, 6 Drawing Sheets

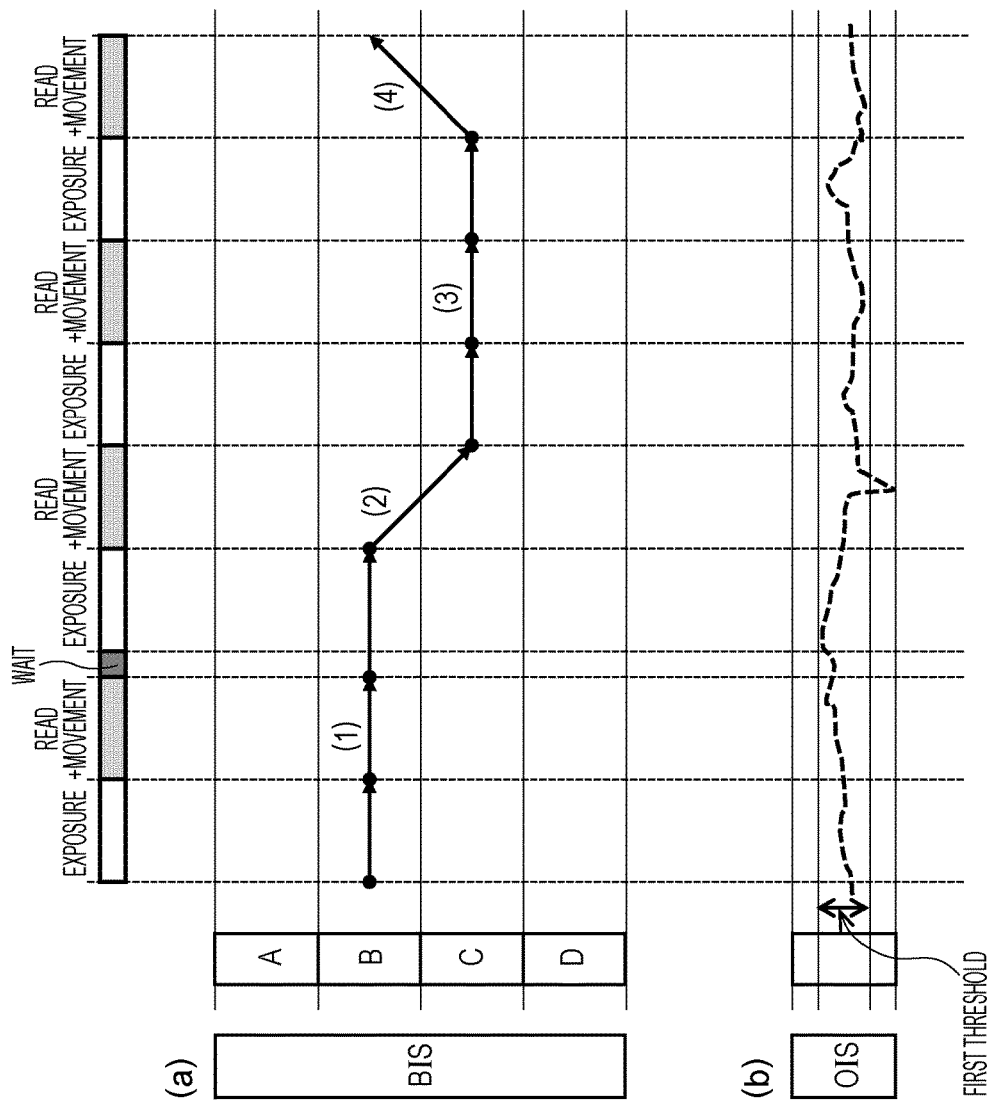

IMAGING DEVICE WITH CONTROLLED TIMING OF IMAGES TO BE SYNTHESIZED BASED ON SHAKE RESIDUAL

BACKGROUND

1. Technical Field

The present disclosure relates to an imaging device that shifts pixels and generates high-definition synthesis image data.

2. Description of the Related Art

A technique that synthesizes a plurality of image data obtained by shifting pixels and generates high-definition image data is known. With this technique, a plurality of image data is obtained while an imaging element is being moved by a moving amount that is predetermined times as large as a pixel pitch, and the obtained plurality of image data is synthesized, so that high-definition synthesis image data is generated.

In this technique, when the moved imaging element is shifted from an intended position by an influence such as a camera shake, high-definition synthesis image data cannot be generated.

PTL 1 discloses an imaging device that obtains image data on a specific region of the imaging element and image data on a region other than the specific region at different timings so as to generate high-resolution synthesis image data.

CITATION LIST

Patent Literature

PTL 1: Unexamined Japanese Patent Publication No. 2016-5094

SUMMARY

The present disclosure provides an imaging device that improves definition of synthesis image data to be generated by synthesizing a plurality of image data while repressing an influence of a camera shake.

An imaging device of the present disclosure includes an optical system having a plurality of lenses, an imaging element that images a subject image formed by the optical system, a shake detector that detects a shake of the imaging device, a lens driving controller that moves one of the plurality of lenses on a plane perpendicular to an optical axis and corrects the shake based on an output signal from the shake detector, an imaging element driver that moves the imaging element on the plane perpendicular to the optical axis, an imaging controller that causes the imaging element to perform an imaging operation to obtain image data, and an image processor that performs a plural number of the imaging operations while moving the imaging element by a predetermined amount and synthesizes a plurality of obtained images to generate a synthesis image. The imaging controller controls a timing of imaging a plurality of images to be synthesized by the image processor, based on a shake residual of the shake correction in the lens driving controller.

The imaging device of the present disclosure can improve definition of synthesis image data to be generated by synthesizing a plurality of image data while repressing an influence of a camera shake.

BRIEF DESCRIPTION OF THE DRAWINGS

FIG. 6 illustrates a time change between the driving of the image element and the amount of shake residual in the OIS processor on a yawing side during the high-resolution photography according to the first exemplary embodiment.

DETAILED DESCRIPTION

Exemplary embodiments are described in detail below suitably with reference to the drawings. Description that is more detailed than necessary is occasionally omitted. For example, detailed description about already well-known matters and overlapped description about substantially the same configuration are occasionally omitted. This is to avoid the following description from being unnecessarily redundant and have a person skilled in the art easily understand the present disclosure.

The accompanying drawings and the following description are provided in order to have the skilled in the art fully understand the present disclosure, and the drawings and the description are not intended to limit a subject matter described in the claims. A digital camera is described below as one example of an imaging device.

First Exemplary Embodiment

The digital camera according to this exemplary embodiment has a shake correcting function for reducing an influence of a shake of the digital camera to be exerted on a picked-up image in an interchangeable lens and a camera main body. The digital camera according to this exemplary embodiment shifts pixels to generate a synthesis image with high resolution or with a sense of high-resolution using the shake correcting function provided to the camera main body. This photography method is defined as a "high-resolution mode". A configuration and an operation of the camera according to this exemplary embodiment are described in detail below.

In the following description, a function for correcting a shake through a shift of a correcting lens in the interchangeable lens is called an "OIS (Optical Image Stabilizer) function". Further, a function for correcting a shake through a shift of the imaging element in the camera main body is called a "BIS (Body Image Stabilizer) function".

1. Configuration

Figure 1:
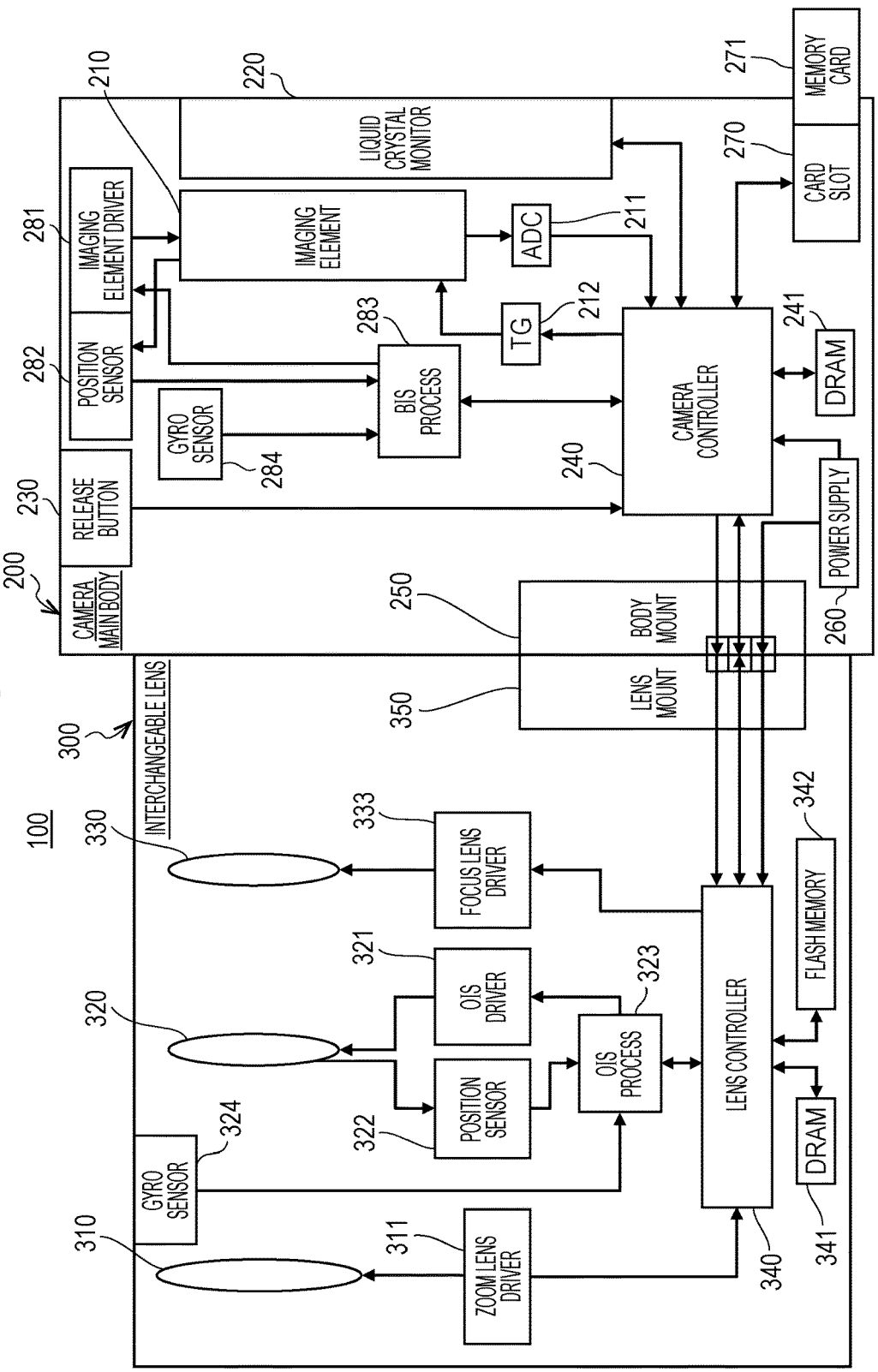
FIG. 1 is a block diagram illustrating a configuration of a digital camera according to a first exemplary embodiment.

FIG. 1 is a block diagram illustrating a configuration of digital camera 100 according to the first exemplary embodiment. Digital camera 100 is configured by camera main body 200 and interchangeable lens 300 that is detachable from camera main body 200.

1-1. Camera Main Body

Camera main body 200 includes imaging element 210, liquid crystal monitor 220, release button 230, camera controller 240, body mount 250, power supply 260, and card slot 270.

Imaging element 210 images a subject image incident via interchangeable lens 300 and generates image data. The generated image data is digitized by AD converter (Analog-to-Digital Converter (ADC)) 211. Imaging element 210 operates at a timing controlled by timing generator 212. The operation of imaging element 210 includes an operation for imaging a still image, and an operation for imaging a through-the-lens image. The through-the-lens image is mainly a moving image, and is displayed on liquid crystal monitor 220 so that a user decides a composition for imaging a still image.

Liquid crystal monitor 220 displays an image represented by display image data that is subject to an image process in camera controller 240. Liquid crystal monitor 220 can selectively display a moving image and a still image. Liquid crystal monitor 220 has a touch sensor function. When the user touches an operation screen displayed on liquid crystal monitor 220, the user can perform various settings on digital camera 100.

Release button 230 accepts an operation from the user. When the user half-presses release button 230, an autofocus operation on interchangeable lens 300 is instructed. When a full-press operation of release button 230 is accepted form the user, an operation for photographing a subject image to be formed via interchangeable lens 300 is performed.

Camera controller 240 controls components such as imaging element 210 according to the instruction from release button 230 so as to control the entire operation of digital camera 100. Camera controller 240 transmits a vertical synchronization signal to timing generator (TG) 212. In parallel, camera controller 240 generates an exposure synchronization signal. Camera controller 240 periodically transmits the generated exposure synchronization signal to lens controller 340 via body mount 250 and lens mount 350. Camera controller 240 uses DRAM (Dynamic Random Access Memory) 241 as a work memory during a control operation or an image processing operation. Camera controller 240 executes a predetermined image process on image data digitized by AD converter 211. The predetermined image process includes, for example, a gamma correcting process, a white balance correcting process, a flaw correcting process, a YC converting process, an electronic zoom process, and a JPEG (Joint Photographic Experts Group) compression process. Camera controller 240 synthesizes a plurality of generated image data while shifting pixels, as described later, and generates high-resolution image data.

Camera controller 240 may be configured by a hard-wired electronic circuit or by a microcomputer using a program.

Body mount 250 can be mechanically or electrically connected to lens mount 350 of interchangeable lens 300. Camera main body 200 and interchangeable lens 300 can transmit/receive data to/from body mount 250 via a connector provided to lens mount 350. Body mount 250 transmits the exposure synchronization signal received from camera controller 240 to lens controller 340 via lens mount 350. The other control signals received from camera controller 240 are transmitted to lens controller 340 via lens mount 350. Body mount 250 transmits the signals received form lens controller 340 via lens mount 350 to camera controller 240. Body mount 250 supplies an electric power form power supply 260 to whole interchangeable lens 300 via lens mount 350.

Power supply 260 supplies an electric power to respective components in digital camera 100.

Card slot 270 is detachable from memory card 271. Card slot 270 controls memory card 271 based on control made by camera controller 240. Digital camera 100 can store image data in memory card 271, or can read image data from memory card 271.

Camera main body 200 includes imaging element driver 281 that moves imaging element 210, and position sensor 282 that detects a position of imaging element 210 in order to realize a BIS (Back-Illuminated Sensor) function and a pixel shift. Imaging element driver 281 can be realized by, for example, a magnet and a flat coil. Camera main body 200 includes gyro sensor 284 that detects a shake of camera main body 200, and BIS processor 283 that controls the shake correcting process based on a detection result of gyro sensor 284 as the configuration that realizes the BIS function.

Position sensor 282 is a sensor that detects a position of imaging element 210 in a plane vertical to an optical axis of the optical system. Position sensor 282 can be realized by, for example, a magnet and a hole element. BIS processor 283 controls imaging element driver 281 based on a signal from gyro sensor 284 and a signal from position sensor 282. As a result, BIS processor 283 shifts imaging element 210 in the plane vertical to the optical axis so that the shake of camera main body 200 is offset.

Imaging element 210 is a CMOS (Complementary Metal Oxide Semiconductor) image sensor or a CCD (Charge Coupled Device) image sensor. Further, imaging element driver 281 may be a stepping motor, a voice coil motor, or another actuator. When the stepping motor is used as the actuator, an open control is enabled, and accordingly the position sensor can be omitted.

1-2. Interchangeable Lens

Interchangeable lens 300 includes the optical system, lens controller 340, and lens mount 350. The optical system includes zoom lens 310, OIS lens 320, and focus lens 330.

Zoom lens 310 is a lens that changes the magnification of a subject image to be formed by the optical system. Zoom lens 310 is configured by one or a plurality of lenses. Zoom lens driver 311 includes a zoom ring and the like that can be operated by the user, transmits an operation from the user to zoom lens 310 so as to move zoom lens 310 along a direction of the optical axis of the optical system.

Focus lens 330 is a lens that changes a focus state of a subject image to be formed on imaging element 210 by the optical system. Focus lens 330 is configured by one or a plurality of lenses.

Focus lens driver 333 includes a motor, and moves focus lens 330 along the optical axis of the optical system based on control of lens controller 340. Focus lens driver 333 can be realized by a DC motor, a stepping motor, a servo motor, or an ultrasonic motor.

Lens controller 340 controls an entire operation of interchangeable lens 300 according to an operation performed by the user using the zoom ring and the like or a control signal received from camera controller 240 via lens mount 350. Lens controller 340 uses DRAM 341 as a work memory during the control operation or the image processing operation. Flash memory 342 stores lens data representing lens characteristics of interchangeable lens 300. The lens data are data whose format is provided such that camera controller 240 can recognize a lens name, an F value, a focal distance, and the like.

Lens controller 340 may be configured by a hard-wired electronic circuit or by a microcomputer using a program.

OIS lens 320 is a lens that corrects a shake of a subject image to be formed by the optical system of interchangeable lens 300 in the OIS function (a function for correcting a camera shake according to a shift of OIS lens 320). OIS lens 320 moves to a direction where a shake of digital camera 100 is offset so as to reduce a shake of a subject image on imaging element 210. OIS lens 320 is configured by one or a plurality of lenses. OIS driver 321 shifts OIS lens 320 in a plane vertical to the optical axis of the optical system upon control from OIS processor 323.

OIS driver 321 can be realized by, for example, a magnet and a flat coil. Position sensor 322 is a sensor that detects a position of OIS lens 320 in the plane vertical to the optical axis of the optical system. Position sensor 322 can be realized by, for example, a magnet and a hole element. OIS processor 323 controls OIS driver 321 based on an output from position sensor 322 and an output from gyro sensor 324 (a shake detector). As OIS driver 321, an actuator such as an ultrasonic motor may be used.

Gyro sensor 284 or gyro sensor 324 detects shakes (vibrations) in a yawing direction and a pitching direction based on an angular variation per unit time of digital camera 100, namely, an angular velocity. Gyro sensor 284 or gyro sensor 324 outputs angular velocity signals representing the detected shake amounts (the angular velocities) to OIS processor 323 or BIS processor 283. The angular velocity signals output from gyro sensor 284 or gyro sensor 324 may include wide frequency components caused by a camera shake, a camera noise, or the like. In this exemplary embodiment, a gyro sensor is used as an angular velocity detector. However, instead of the gyro sensor, another sensor can be used as long as it can detect a shake of digital camera 100.

2. Operation

Figure 2:
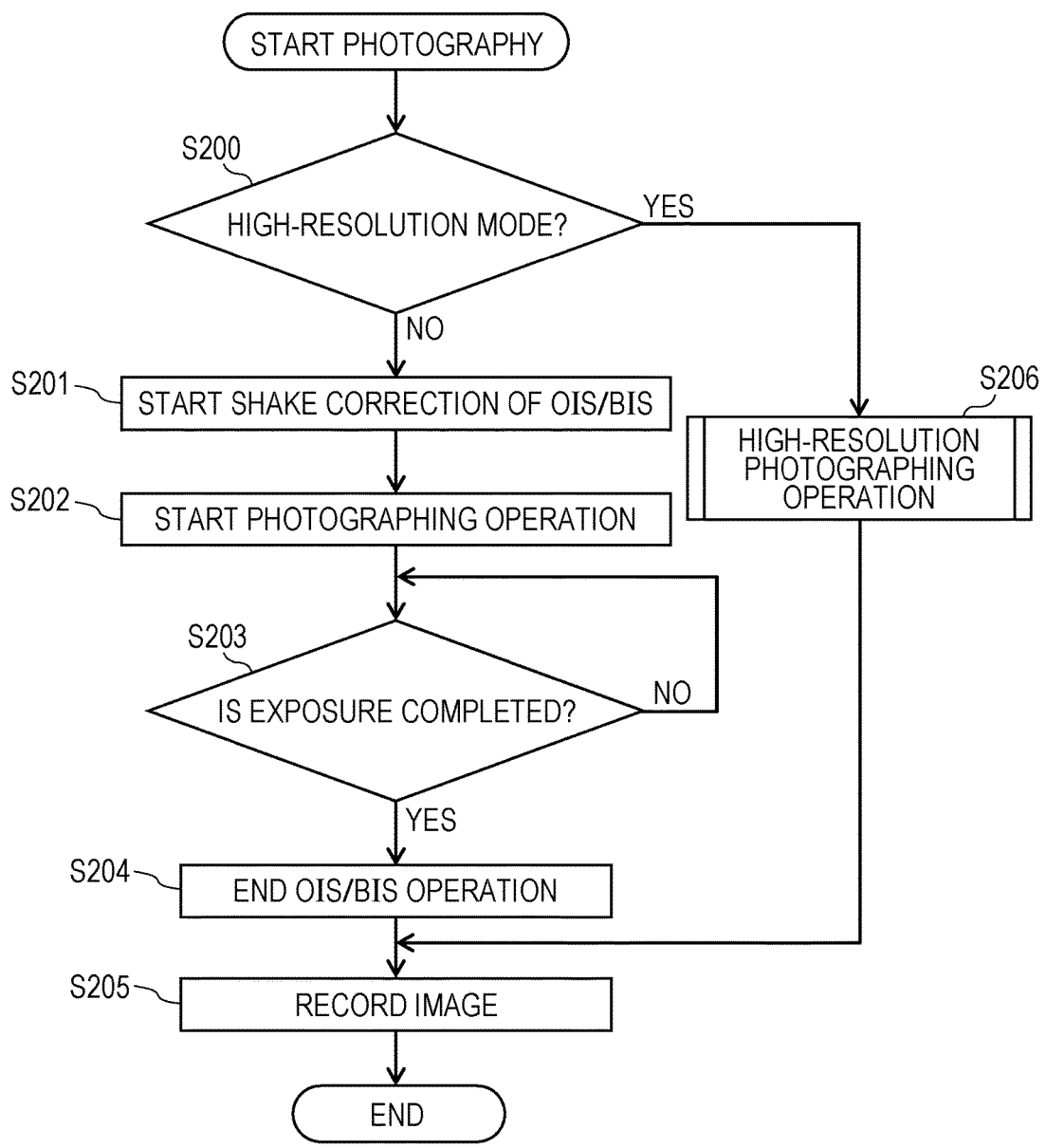
FIG. 2 is a flowchart illustrating a process for performing a photographing operation according to the first exemplary embodiment.

The operation of digital camera 100 in this exemplary embodiment described with reference to a flowchart. FIG. 2 is a flowchart illustrating a process for performing a photographing operation according to the first exemplary embodiment.

Camera controller 240 determines whether a currently set mode is a high-resolution mode (step S200). Camera controller 240 holds settings performed by the user on liquid crystal monitor 220, and makes the determination based on the settings.

When determining that the currently set mode is not the high-resolution mode (No at step S200), camera controller 240 performs a normal operation for photographing a still image. Gyro sensor 284 or gyro sensor 324 detects amounts of shakes (vibrations) of digital camera 100 in the yawing direction and in the pitching direction, and outputs angular velocity signals representing the detected shake amounts to OIS processor 323 or BIS processor 283. OIS processor 323 controls OIS driver 321, and drives OIS lens 320 to correct the shake so that the shake amount detected by gym sensor 324 is offset. BIS processor 283 controls imaging element driver 281, and drives imaging element 210 to correct the shake so that the shake amount detected by gyro sensor 284 is offset (step S201). OIS processor 323 and BIS processor 283 operate cooperatively. As one example of the cooperative operation, OIS processor 323 performs the shake correction so that an angular velocity signal with high frequency in the angular velocity signals representing the detected shake amounts is offset, and BIS processor 283 performs the shake correction so that an angular velocity signal with low frequency is offset.

Camera controller 240 starts the photographing operation (step S202). Camera controller 240 instructs lens controller 340 and imaging element 210 to start exposure. Camera controller 240 allows AD converter 211 to digitize image data imaged by imaging element 210 after the exposure is completed (Yes at step S203), and executes the predetermined image process on the digitized image data. Camera controller 240 instructs OIS processor 323 and BIS processor 283 to end the shake correcting operation (step S204). Camera controller 240 records the generated image data in memory card 271 (step S205).

Figure 3:
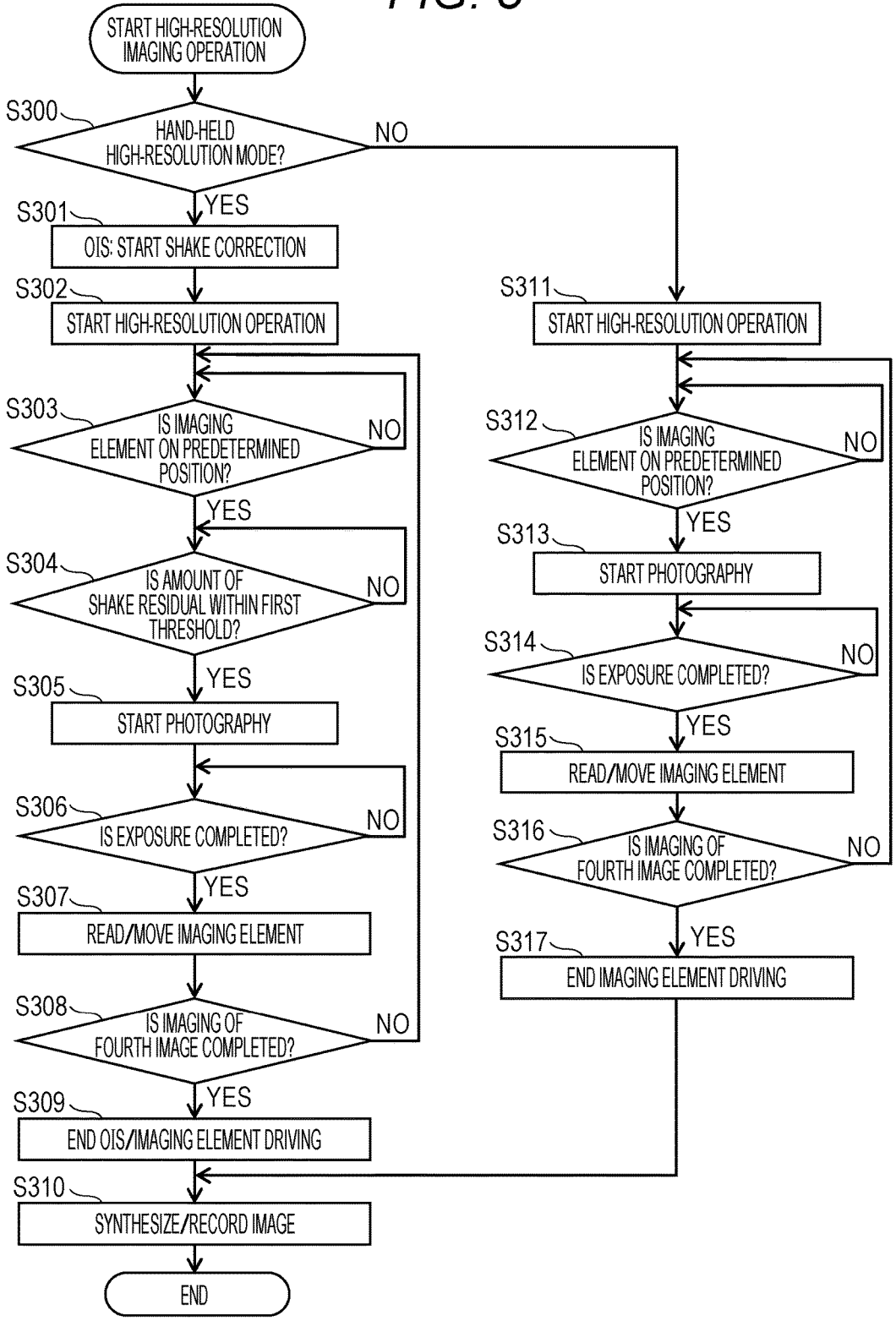
FIG. 3 is a flowchart illustrating a process for performing high-resolution photography according to the first exemplary embodiment.

In FIG. 2, when camera controller 240 determines that the currently set mode is the high-resolution mode (Yes at step S200), a high-resolution photographing operation is performed (step S206). FIG. 3 is a flowchart illustrating a process for performing the high-resolution photography according to the first exemplary embodiment.

Camera controller 240 determines whether the currently set mode is a hand-held high-resolution mode (step S300). Camera controller 240 holds settings performed by the user on liquid crystal monitor 220, and makes the determination based on the settings.

When determining as the hand-held high-resolution mode (Yes at step S300), camera controller 240 instructs OIS processor 323 to start the shake correcting operation via body mount 250, lens mount 350, and lens controller 340 (step S301). MS processor 323 controls OIS driver 321, and drives OIS lens 320 to correct the shake so that the shake amount (the angular velocity) detected by gyro sensor 324 is offset.

Camera controller 240 controls imaging element driver 281 via BIS processor 283, and starts the high-resolution photography for performing the imaging operation while driving imaging element 210 in a predetermined direction by a predetermined amount (step S302).

The high-resolution photography is described with reference to FIGS. 4, 5, and 6.

Figure 4:
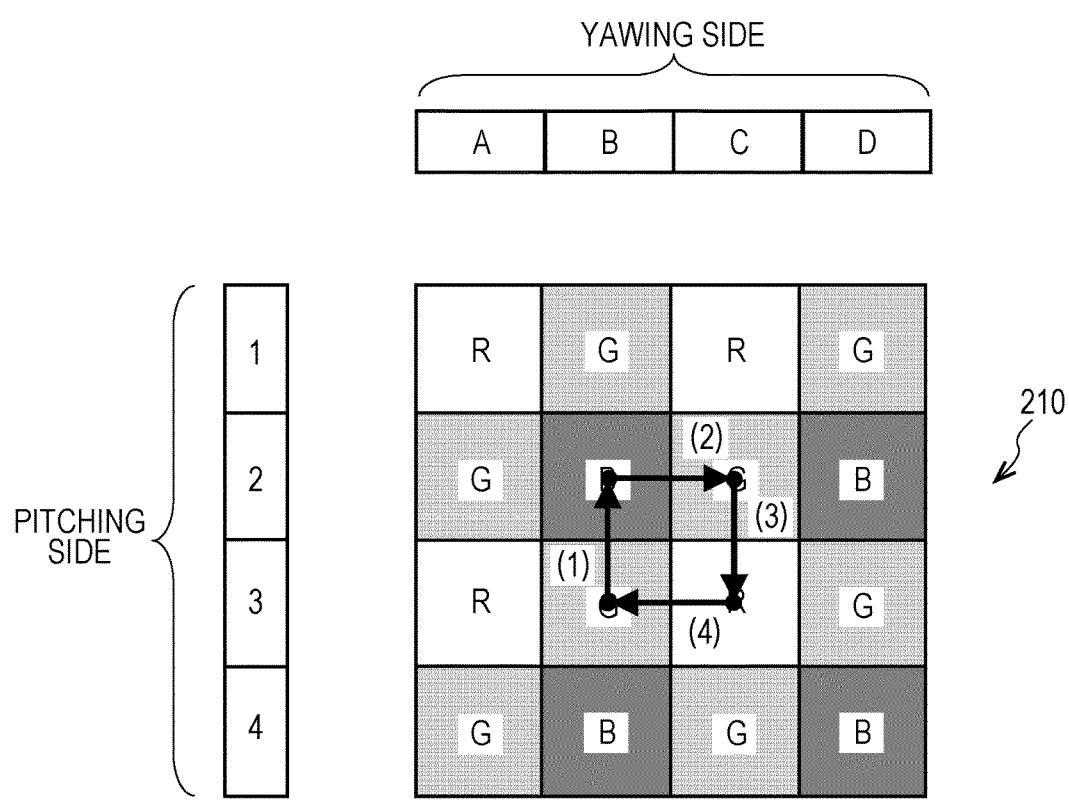
FIG. 4 illustrates an outline of a method for driving an imaging element in the high-resolution photography according to the first exemplary embodiment.

FIG. 4 illustrates an outline of a method for driving imaging element 210 in the high-resolution photography according to the first exemplary embodiment. In FIG. 4, a square of 4×4 represents some of the pixels configuring imaging element 210 (4×4 pixels). 1 to 4 on the pitching side and A to D on the yawing side are used for specifying pixels in imaging element 210.

Figure 5:
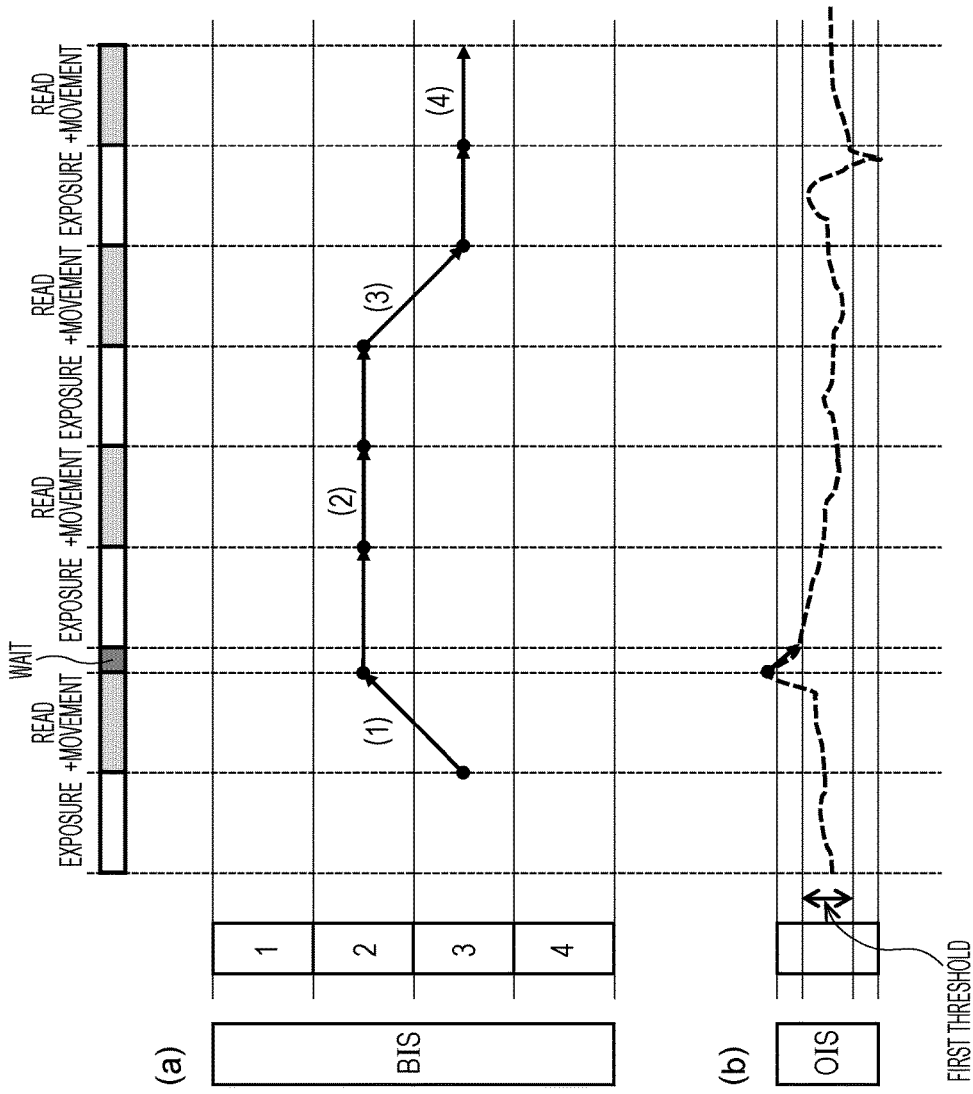
FIG. 5 illustrates a time change between driving of the imaging element and an amount of shake residual in an OIS (Optical Image Stabilizer) processor on a pitching side during the high-resolution photography according to the first exemplary embodiment.

FIG. 5 illustrates a time change between driving of imaging element 210 and an amount of shake residual in OIS processor 323 on the pitching side during the high-resolution photography according to the first exemplary embodiment. FIG. 6 illustrates a time change between driving of imaging element 210 and an amount of shake residual in MS processor 323 on the yawing side during the high-resolution photography according to the first exemplary embodiment. Parts (a) of FIGS. 5 and 6 represent the time change in the pixel position of the center of imaging element 210 on the pitching side and the yawing side. Parts (b) of FIGS. 5 and 6 represent the change in the amount of shake residual with a time in OIS processor 323. The amount of shake residual means the amount of residual shake that is not offset in OIS processor 323 after OIS driver 321 is driven so that the shake amount calculated based on the angular velocity detected by gyro sensor 324 is offset. In parts (b) of FIGS. 5 and 6, second and third horizontal lines from the top represent a width of a threshold with respect to the amount of shake residual, and ±0.5 pixel is set as a first threshold. The threshold is not limited to ±0.5 pixel and may be a smaller value. When the threshold is set to a small value, definition of a synthesis image to be generated by a synthesizing process, described later, can be improved. However, since it takes a time to obtain an image to be used for the synthesizing process according to usage environment, the threshold is set in consideration of both the definition and the time.

As shown in FIGS. 4, 5, and 6, when the high-resolution photography is started, the center of imaging element 210 is on the center of a pixel on the pitching side 3 and the yawing side B. Camera controller 240 determines whether imaging element 210 is on a predetermined position of the high-resolution photography (a photography position of a first image) (step S303). Thereafter, camera controller 240 determines whether the amount of shake residual on the pitching side and the yawing side is within the first threshold in OIS processor 323. When the amount is within the first threshold (Yes at step S304), the photographing operation is started (step S305). Even when the amount of shake residual is not within the first threshold, photographing operation may be started in the case that the amount of shake residual is close to the first threshold and the amount of shake residual during the photography is expected to be within the first threshold. Camera controller 240 instructs lens controller 340 and imaging element 210 to start exposure. After the exposure is completed (Yes at step S306), camera controller 240 drives to move imaging element 210 while reading the image data imaged by imaging element 210 (step S307). In a concrete moving method, camera controller 240 makes imaging element driver 281 move imaging element 210 to the pitching side by one pixel ((1) in FIG. 4), and move imaging element 210 so that the center of imaging element 210 comes to the center of a pixel on the pitching side 2 and the yawing side B. As a result, the photography of the first image is completed (No at step S308).

Camera controller 240 determines whether imaging element 210 is on a predetermined position of the high-resolution photography (a photography position of a second image) (step S303). Camera controller 240 determines whether the amount of shake residual is within the first threshold in OIS processor 323. As shown in part (b) of FIG. 5, the amount of shake residual on the pitching side exceeds the first threshold on this position, and camera controller 240 waits until the amount of shake residual falls within the first threshold. After the amount of shake residual falls within the first threshold (Yes at step S304), the photographing operation is started (step S305). Camera controller 240 instructs lens controller 340 and imaging element 210 to start exposure. After the exposure is completed (Yes at step S306), camera controller 240 drives to move imaging element 210 while reading the image data imaged by imaging element 210 (step S307). In a concrete moving method, camera controller 240 moves imaging element 210 to the yawing side by one pixel ((2) in FIG. 4), and moves imaging element 210 so that the center of imaging element 210 comes to the center position of a pixel on the pitching side 2 and the yawing side C. As a result, the photography of the second image is completed (No at step S308).

Similarly, camera controller 240 photographs a third image. As shown in part (b) of FIG. 6, although the amount of shake residual on the yawing side exceeds the first threshold during the driving of imaging element 210, the amount of shake residual is the first threshold or less when the exposure is started. For this reason, camera controller 240 starts the exposure. After the exposure is completed, camera controller 240 moves imaging element 210 to the pitching side by one pixel ((3) in FIG. 4), and moves imaging element 210 so that the center of imaging element 210 conies to the center position of a pixel on the pitching side 3 and the yawing side C (step S307).

Similarly, camera controller 240 photographs a fourth image. After the exposure is completed, camera controller 240 moves imaging element 210 to the yawing side by one pixel ((4) in FIG. 4), and moves imaging element 210 so that the center of imaging element 210 comes to the center position of a pixel on the pitching side 3 and the yawing side B (step S307). This movement returns imaging element 210 to the first position at the start of the high-resolution photography.

After the photography of the fourth image is completed (Yes step S308), camera controller 240 ends the driving of OIS lens 320 and imaging element 210 (step S309). Camera controller 240 synthesizes the photographed four images to generate a high-definition synthesis image. Camera controller 240 records the generated synthesis image in memory card 271 (step S310). Conventionally proposed various methods may be applied to the image synthesizing method.

Next, a process when camera controller 240 determines that the currently set mode is not the hand-held high-resolution mode is described below (No at step S300). In the high-resolution mode but not in the hand-held high-resolution mode, digital camera 100 is fixed to a tripod and is in a mode where a hand shake does not occur. In this mode, camera controller 240 does not have to allow OIS processor 323 to correct a hand shake. The state of being not in the hand-held high-resolution mode may be set by the user operating liquid crystal monitor 220, or may be automatically set by detecting that the high-resolution is set and digital camera 100 is fixed to the tripod.

Camera controller 240 controls imaging element driver 281 via BIS processor 283 to drive imaging element 210 to a predetermined direction by a predetermined amount. As a result, the high-resolution photography for performing the imaging operation is started (step S311).

At the start of the high-resolution photography, the center of imaging element 210 is at the center of the pixel on the pitching side 3 and the yawing side B. Camera controller 240 determines whether imaging element 210 is on the predetermined position of the high-resolution photography (the photography position of the first image) (Yes at step S312), and the photographing operation is started (step S313). Camera controller 240 instructs lens controller 340 and imaging element 210 to start exposure. After the completion of the exposure (Yes at step S314), camera controller 240 drives to move imaging element 210 while reading the image data imaged by imaging element 210 (step S315). In the concrete moving method, camera controller 240 allows imaging element driver 281 to move imaging element 210 to the pitching side by one pixel ((1) in FIG. 4), and move imaging element 210 so that the center of imaging element 210 comes to the center of the pixel on the pitching side 2 and the yawing side B. As a result, the photography of the first image is completed (No at step S316).

After the completion of the exposure, camera controller 240 moves imaging element 210 while reading the image data imaged by imaging element 210 similarly to the operation in the hand-held high-resolution mode. As a result, the image data of the second to fourth images are obtained.

After the completion of the photography of the fourth image (Yes step S316), camera controller 240 ends the driving of imaging element 210 (step S317). Camera controller 240 synthesizes the photographed four images to generate a high-definition synthesis image. Camera controller 240 records the generated synthesis image in memory card 271 (step S310).

3. Conclusion

The imaging device corresponding to digital camera 100 according to this exemplary embodiment includes the optical system having the plurality of lenses, imaging element 210 that images a subject image formed by the optical system, a shake detector corresponding to gyro sensor 324 that detects a shake of the imaging device, and a lens driving controller corresponding to OIS processor 323 that moves one of the plurality of lenses corresponding to OIS lens 320 on the plane perpendicular to an optical axis and corrects the shake based on an output signal from the shake detector. The imaging device further includes imaging element driver 281 that moves imaging element 210 on the plane perpendicular to the optical axis, an imaging controller corresponding to camera controller 240 that causes imaging element 210 to perform the imaging operation to obtain image data, and an image processor corresponding to camera controller 240 that performs a plural number of the imaging operations while moving imaging element 210 by a predetermined amount and synthesizes a plurality of obtained images to generate a synthesis image. The imaging controller controls a timing of imaging a plurality of images to be synthesized by the image processor, based on the amount of shake residual of the shake correction in the lens driving controller.

As a result, the imaging device corresponding to digital camera 100 according to this exemplary embodiment can improve definition of synthesis image data to he generated by synthesizing a plurality of image data while repressing an influence of a camera shake.

The imaging controller compares the amount of shake residual before the imaging of a plurality of images to be synthesized by the image processor with the first threshold. When the amount of shake residual is the first threshold or less, the imaging controller may start the imaging. As a result, an influence of displacement from an intended position of imaging element 210 caused by the hand shake can be repressed, and definition of the synthesis image data can be improved.

Another Exemplary Embodiment

The idea of the present disclosure is not limited to the above exemplary embodiment. Various exemplary embodiments may be considered. Another exemplary embodiment to which the idea of the above embodiment can be applied is described below.

In the first exemplary embodiment, after the amount of shake residual is the first threshold or less, the exposure is started. Even when the amount of shake residual exceeds the first threshold, the exposure is started, and after the exposure, the exposure is again performed on the position of imaging element 210 where the amount of shake residual exceeds the first threshold at the start of the exposure. The exposure may be repeated until an image where the amount of shake residual at the start of the exposure is the first threshold or less can be obtained. In this case, camera controller 240 synthesizes images whose amount of shake residual at the start of the exposure is the first threshold or less to generate a synthesis image.

The first exemplary embodiment has described the form that the amount of shake residual at the start of the exposure is compared with the first threshold. Camera controller 240 may calculate an average of the amount of shake residuals during the exposure, and may compare the average of the amount of shake residuals with a second threshold (for example, ±0.5 pixel). After the exposure is completed, the exposure may be again performed on a position of imaging element 210 where the average of the amount of shake residuals exceeds the second threshold, and may be repeated until an image where the average of the amount of shake residuals is the second threshold or less can be obtained. In this case, camera controller 240 synthesizes images where the average of the amount of shake residuals is the second threshold or less so as to generate a synthesis image. The second threshold is ±0.5 pixel, but another threshold may be set in consideration of accuracy of the high resolution or a photography time. The average is used as a judgment standard, but the maximum value or the minimum value within the exposure time may be used for the judgment.

As a result, a plurality of images where the influence of a hand shake is repressed and that is imaged on the positions of imaging element 210 intended by the user can be obtained, and definition of the synthesis image data generated by synthesizing the obtained images can be improved.

The first exemplary embodiment has described the form where imaging element 210 is driven to perform the imaging four tunes, the four images are synthesized and a synthesis image is generated. The number of the images to be synthesized does not have to be four, and another number of images may be used. When the number of images to be synthesized is increased, definition of a synthesis image can be heightened, and when the number of images to be synthesized is decreased, the photography time can be shortened.

The first exemplary embodiment has described the form where imaging element 210 is driven so that a movement locus becomes squire per pixel. The width and the direction when camera controller 240 drives imaging element 210 are not limited to the above form, and another form may be employed. Camera controller 240 may drive imaging element 210 per 0.5 pixel, or another movement locus may be drawn.

The first exemplary embodiment has described digital camera 100 of an interchangeable lens system. Digital camera 100 may be a lens integrated camera as long as the OIS function is provided to the lens side.

The imaging controller corresponding to camera controller 240 according to this exemplary embodiment may hold the amount of shake residual at the start of the imaging of a plurality of images to be synthesized by the image processor corresponding to camera controller 240, and may again perform the imaging on an image where the amount of shake residual exceeds the first threshold on the same position of imaging element 210 as the position where the image is imaged. The image processor may synthesize images where the amount of shake residual is the first threshold or less to generate a synthesis image. As a result, a plurality of images where the influence of a hand shake is repressed and that is imaged on the positions of imaging element 210 intended by the user can be obtained, and definition of the synthesis image data generated by synthesizing the obtained images can be improved.

Further, the imaging controller corresponding to camera controller 240 may calculate the amount of shake residuals during the imaging for each image when imaging a plurality of images to be synthesized by the image processor corresponding to camera controller 240, and may again perform the imaging on an image where an average, a maximum value, or a minimum value in the amount of shake residuals during the imaging exceeds the second threshold on the same position of the imaging element as the position where the image is imaged. The image processor may synthesize the images where the average, maximum value or the minimum value is the second threshold or less so as to generate a synthesis image. As a result, a plurality of images where the influence of a hand shake is repressed and that is imaged on the positions of imaging element 210 intended by the user can be obtained, and definition of the synthesis image data generated by synthesizing the obtained images can be improved.

The exemplary embodiments have been described above as the example of the technique disclosed in the present disclosure. For this reason, the detailed description and the accompanying drawings are disclosed. Therefore, the components described in the detailed description and the accompanying drawings occasionally include components that are not essential for solving the problem. Therefore, even if these unessential components are described in the accompanying drawings and the detailed description, these unessential components should not be immediately approved as being essential.

The above embodiments are for illustrating the technique in the present disclosure. Therefore, in the above embodiments, various modifications, substitutions, additions and/or omissions can be performed within the scope of claims and equivalent scope of claims.

The technique of the present disclosure can be applied to electronic devices having a camera shake correcting function (imaging device such as digital cameras and camcorders, mobile phones, and smartphones).

What is claimed is:

1. An imaging device comprising:
an optical system including a plurality of lenses;
an imaging element that images a subject image formed by the optical system;
a shake sensor that detects a shake of the imaging device;
a lens driving processor that moves one of the plurality of lenses on a plane perpendicular to an optical axis based on an output signal from the shake sensor to correct the shake;
an imaging element driver that moves the imaging element on the plane perpendicular to the optical axis;
an imaging controller that causes the imaging element to perform an imaging operation to obtain image data; and
an image processor that performs a plural number of the imaging operations while moving the imaging element by a predetermined amount, and synthesizes a plurality of images obtained to generate a synthesis image,
wherein the imaging controller controls a timing of imaging the plurality of images to be synthesized by the image processor, based on an amount of shake residual of shake correction in the lens driving processor, and
the imaging controller compares the amount of shake residual before start of imaging of the plurality of images to be synthesized by the image processor with a first threshold, and when the amount of shake residual is the first threshold or less, starts the imaging.

2. The imaging device according to claim 1, wherein
the imaging controller holds the amount of shake residual at start of imaging of the plurality of images to be synthesized by the image processor, and again performs the imaging on an image where the amount of shake residual exceeds the first threshold at a position of the imaging element which is identical to a position where the image is imaged, and
the image processor synthesizes images where the amount of shake residual is the first threshold or less to generate the synthesis image.

3. The imaging device according to claim 2, wherein
the imaging controller calculates an average in the amount of shake residual during the imaging for each of the plurality of images when imaging the plurality of images to be synthesized by the image processor, and again performs the imaging on an image where the average, a maximum value, or a minimum value in the amount of shake residual during the imaging exceeds a second threshold at a position of the imaging element which is identical to a position where the image is imaged, and
the image processor synthesizes images where the average, the maximum value or the minimum value is the second threshold or less to generate the synthesis image.

* * * * *